US011805303B2

(12) United States Patent
Curcio et al.

(10) Patent No.: US 11,805,303 B2
(45) Date of Patent: Oct. 31, 2023

(54) METHOD AND APPARATUS FOR STORAGE AND SIGNALING OF MEDIA SEGMENT SIZES AND PRIORITY RANKS

(71) Applicant: Nokia Technologies Oy, Espoo (FI)

(72) Inventors: Igor Curcio, Tampere (FI); Miska Hannuksela, Tampere (FI); Sujeet Shyamsundar Mate, Tampere (FI); Emre Aksu, Tampere (FI); Ari Hourunranta, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/296,900

(22) PCT Filed: Dec. 30, 2019

(86) PCT No.: PCT/FI2019/050928
§ 371 (c)(1),
(2) Date: May 25, 2021

(87) PCT Pub. No.: WO2020/141259
PCT Pub. Date: Jul. 9, 2020

(65) Prior Publication Data
US 2022/0038791 A1 Feb. 3, 2022

Related U.S. Application Data

(60) Provisional application No. 62/788,365, filed on Jan. 4, 2019.

(51) Int. Cl.
*H04N 21/845* (2011.01)
*H04N 21/231* (2011.01)
(Continued)

(52) U.S. Cl.
CPC ... *H04N 21/8456* (2013.01); *H04N 21/23109* (2013.01); *H04N 21/44209* (2013.01); *H04N 21/462* (2013.01); *H04N 21/4728* (2013.01)

(58) Field of Classification Search
CPC ......... H04N 21/8456; H04N 21/23109; H04N 21/44209; H04N 21/462; H04N 21/4728;
(Continued)

(56) References Cited

U.S. PATENT DOCUMENTS

| 9,338,209 B1 | 5/2016 | Begen et al. |
| 2004/0022453 A1* | 2/2004 | Kusama ................. G06T 11/00 382/302 |

(Continued)

FOREIGN PATENT DOCUMENTS

| CN | 106471815 A | 3/2017 |
| WO | 2018/169176 A1 | 9/2018 |

(Continued)

OTHER PUBLICATIONS

Specification & Drawings—Hyunmook Oh and Sejin Oh, Region Wise Image Quality Indication Method for Multi-Region Based Video Service, Sep. 17, 2017.*

(Continued)

*Primary Examiner* — Adil Ocak
(74) *Attorney, Agent, or Firm* — Joseph C. Drish; Harrington & Smith

(57) ABSTRACT

A method, apparatus and computer program product to signal and store various segment properties in omnidirectional media, including sizes, priority ranks, and the like. The method, apparatus and computer program product access one or more media segments (30). The one or more media segments includes media data configured for streaming playback. The method, apparatus and computer program product access size information (32) or priority rank information of one or more tiles for each of the one or more media segments. The method, apparatus and computer program product encode the size information (34) or priority rank information for each of the one or more media seg- (Continued)

ments in a media file within one or more metadata tracks associated with the one or more media segments or one or more sub-segments associated with the one or more media segments.

12 Claims, 10 Drawing Sheets

(51) Int. Cl.
  *H04N 21/442* (2011.01)
  *H04N 21/462* (2011.01)
  *H04N 21/4728* (2011.01)
(58) Field of Classification Search
  CPC .......... H04N 21/26258; H04N 21/647; H04N 21/845; H04N 21/234345; H04N 21/816; H04L 65/4084; H04L 65/607; H04L 65/612; H04L 65/70
  See application file for complete search history.

(56) References Cited

U.S. PATENT DOCUMENTS

| 2015/0350300 | A1 | 12/2015 | Hirabayashi et al. | |
|---|---|---|---|---|
| 2017/0339415 | A1 | 11/2017 | Wang et al. | |
| 2018/0077451 | A1* | 3/2018 | Yip | H04N 13/117 |
| 2019/0050224 | A1* | 2/2019 | Bajic | G06F 16/9024 |
| 2020/0112710 | A1* | 4/2020 | Oh | H04N 13/194 |
| 2020/0137462 | A1* | 4/2020 | He | H04N 21/21805 |

FOREIGN PATENT DOCUMENTS

| WO | WO-2018/222996 A1 | 12/2018 |
|---|---|---|
| WO | 2019/034803 A1 | 2/2019 |

OTHER PUBLICATIONS

Specification—Hyunmook Oh and Sejin Oh, Region Wise Image Quality Indication Method for Multi-Region Based Video Service, Sep. 17, 2017, Customer No. 67487.*
Specification & Drawings—Yong He & Yan Ye, 360-Degree Video Delivery Over Next Generation Network, Jun. 2, 2017, IDVC 13725US01.*
Deshpande et al., "Text of ISO/IEC FDIS 23090 2:2021, Information technology—Coded representation of Immersive media—Part 2: Omnidirectional media format", ISO/IEC JTC 1/SC 29/WG 3/N00072, MPEG Systems, May 26, 2021, 340 pages.
"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 181 pages.
"Versatile video coding", Series H: Audiovisual and Multimedia Systems Infrastructure of audiovisual services—Coding of moving video, Recommendation ITU-T H.266, Aug. 2020, 516 pages.
"High Efficiency Video Coding", Series H: Audiovisual and Multimedia Systems, Infrastructure of audiovisual services—Coding of moving video, Recommendation ITU-T H.265, Feb. 2018, 692 pages.
"Information Technology—Coding of Audio-Visual Objects—Part 12: ISO Base Media File Format", ISO/IEC 14496-12, Fifth edition, Dec. 15, 2015, 248 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end Packet-switched Streaming Service (PSS); rotocols and codecs (Release 15)", 3GPP TS 26.234, V15.1.0, Sep. 2018, pp. 1-174.
"Information Technology—Dynamic Adaptive Streaming over HTTP (DASH)—Part 1: Media Presentation Description and Segment Formats", ISO/IEC 23009-1, Second Edition, May 15, 2014, 152 pages.
Moats, "URN Syntax", RFC 2141, Network Working Group, May 1997, pp. 1-8.
Berners-Lee et al., "Uniform Resource Identifier (URI): Generic Syntax", RFC 3986, Network Working Group, Jan. 2005, pp. 1-61.
"Advanced Video Coding for Generic Audiovisual services", Series H: Audiovisual and Multimedia Systems, Infrastructure of audio-visual services—Coding of moving Video, Recommendation ITU-T H.264, Apr. 2017, 812 pages.
"Information technology—MPEG systems technologies—Part 14: Partial File Format", ISO/IEC 23001-14, First Edition, Jan. 2019, 10 pages.
International Search Report and Written Opinion received for corresponding Patent Cooperation Treaty Application No. PCT/FI2019/050928, dated Jul. 1, 2020, 17 pages.
Corbillon et al., "Optimal Set of 360-Degree Videos for Viewport-Adaptive Streaming", MM '17: Proceedings of the 25th ACM international conference on Multimedia, Oct. 2017, pp. 943-951.
Wang, Ye-Kui et al., "[OMAF] Editor's Input Text for OMAF WD Based on Finland AHG Agreements", OMAF v2 Editors, ISO/IEC JTC1/SC29/WG11/M42923-v1, Jul. 2018, 203 pages.

* cited by examiner

| 2 | 2 | 2 |
|---|---|---|
| 2 | 1 | 1 |
| 2 | 1 | 1 |

| 2 | 2 | 3 |
|---|---|---|
| 2 | 1 | 1 |
| 3 | 1 | 1 |

000# METHOD AND APPARATUS FOR STORAGE AND SIGNALING OF MEDIA SEGMENT SIZES AND PRIORITY RANKS

RELATED APPLICATION

This application claims priority to PCT Application No. PCT/FI2019/050928, filed on Dec. 30, 2019, which claims priority to U.S. Application No. 62/788,365, filed on Jan. 4, 2019 each of which is incorporated herein by reference in its entirety.

TECHNICAL FIELD

An example embodiment relates generally to omnidirectional media file encoding and decoding.

BACKGROUND

Immersive multimedia such as omnidirectional content consumption is more complex for the end user compared to the consumption of two dimensional (2D) content because of higher degree of freedom available to the end user. The Moving Picture Experts Group (MPEG) Omnidirectional Media Format (OMAF) specification version 1 (v1) standardized the omnidirectional streaming of single three degree of freedom (3DoF) content. 3DoF is an instance where the viewer is located at the centre of a unit sphere and has three degrees of freedom (Yaw-Pitch-Roll). The next phase of standardization, MPEG-I Phase 1b, is expected to enable multiple 3DoF and 3DoF+ (which provides a visual response to the translational motion of the viewer's head) content consumption as well as overlay support with user interaction. In addition, MPEG-I Phase 1b is expected to enable and support means to optimize the Viewport Dependent Streaming operations and bandwidth management.

The MPEG OMAF standard allows bandwidth adaptation using tiles and viewport dependent streaming. A tile bit stream corresponds to a sequence of segments, for example MPEG-Dynamic Adaptive Streaming over Hypertext Transfer Protocol (HTTP) (MPEG-DASH) segments. Tile segment sizes may vary by a large extent. Currently, the MPEG DASH Media Presentation Description (MPD) does not provide a segment-level granularity in terms of bandwidth consumption but carries a session/period wise bandwidth information per representation (or adaptation set). In OMAF Viewport Dependent Streaming (VDS), different tile segments may be downloaded in order to represent a full picture in the spatial domain. The different tile segments may be encoded in different qualities and the sizes of the segments may vary by a large degree. The sizes of the different tile segments are not signaled until the download occurs and this creates a problem in bandwidth management. Bandwidth spikes may occur during a streaming session, and bandwidth throttling effects may be seen due to lack of a fine-grained calculation of required and available bandwidth. In addition, in VDS, tiles which are in the viewport are expected to be at higher quality than the tiles in the non-seen parts.

While selecting which tiles need to be retrieved at high quality, the client has to make a decision based on the available bandwidth and how this bandwidth should be effectively distributed among the tiles to be retrieved. Not all information on the screen is essentially important for the viewer. Hence, some tiles may be desirably left at lower quality if there is not sufficient bandwidth to download all at high quality. Such a decision requires a prioritization among the tiles in a segment. Without a mechanism to signal the segment priority or sizes, how to prioritize the quality switching of tiles is a difficult issue for the media player.

BRIEF SUMMARY

A method, apparatus and computer program product are provided in accordance with an example embodiment to signal and store various segment properties in omnidirectional media, including sizes, priority ranks, and the like. The method, apparatus and computer program product may be utilized in conjunction with a variety of video formats. In one example embodiment, a method is provided that includes accessing one or more media segments. The one or more media segments includes media data configured for streaming playback. The method further includes accessing size information for each of the one or more media segments. The method further includes encoding the size information for each of the one or more media segments in a media file within one or more metadata tracks associated with the one or more media segments or one or more sub-segments associated with the one or more media segments. The one or more metadata tracks comprises one or more byte sizes of one or more tiles in each of the one or more media segments or the one or more sub-segments.

In some implementations of such a method, the one or more metadata tracks represent one or more tiling structure of one or more media tracks associated with the one or more metadata tracks. In some embodiments, the one or more metadata tracks are configured to be made available to a media player together with a presentation of each of the one or more media segments in order to provide prior information about the one or more media segments before a download or a presentation associated with each of the one or more media segments. In some embodiments, the one or more metadata tracks are linked to one or more video adaptation sets or representations in the media file or media presentation manifest information.

In another example embodiment, an apparatus is provided that includes at least one processor and at least one memory including computer program code for one or more programs with the at least one memory and the computer program code configured to, with the at least one processor, cause the apparatus at least to access one or more media segments. The one or more media segments includes media data configured for streaming playback. The computer program code is further configured to, with the at least one processor, cause the apparatus to access size information for each of the one or more media segments. The computer program code is further configured to, with the at least one processor, cause the apparatus to encode the size information for each of the one or more media segments in a media file within one or more metadata tracks associated with the one or more media segments or one or more sub-segments associated with the one or more media segments. The one or more metadata tracks comprises one or more byte sizes of one or more tiles in each of the one or more media segments or the one or more sub-segments.

In some implementations of such an apparatus, the one or more metadata tracks represent one or more tiling structure of one or more media tracks associated with the one or more metadata tracks. In some embodiments, the one or more metadata tracks are configured to be made available to a media player together with a presentation of each of the one or more media segments in order to provide prior information about the one or more media segments before a download or a presentation associated with each of the one or more media segments. In some embodiments, the one or more metadata tracks are linked to one or more video adaptation sets or representations in the media file or media presentation manifest information.

In another example embodiment, a computer program product is provided that includes at least one non-transitory computer-readable storage medium having computer executable program code instructions stored therein with the computer executable program code instructions comprising program code instructions configured, upon execution, to access one or more media segments. The one or more media segments includes media data configured for streaming playback. The computer executable program code instructions comprise program code instructions that are further configured, upon execution, to access size information for each of the one or more media segments. The computer executable program code instructions comprise program code instructions that are further configured, upon execution, to encode the size information for each of the one or more media segments in a media file within one or more metadata tracks associated with the one or more media segments or one or more sub-segments associated with the one or more media segments. The one or more metadata tracks comprises one or more byte sizes of one or more tiles in each of the one or more media segments or the one or more sub-segments.

In some implementations of such a computer program product, the one or more metadata tracks represent one or more tiling structure of one or more media tracks associated with the one or more metadata tracks. In some embodiments, the one or more metadata tracks are configured to be made available to a media player together with a presentation of each of the one or more media segments in order to provide prior information about the one or more media segments before a download or a presentation associated with each of the one or more media segments. In some embodiments, the one or more metadata tracks are linked to one or more video adaptation sets or representations in the media file or media presentation manifest information.

In another example embodiment, an apparatus is provided that includes means for accessing one or more media segments. The one or more media segments includes media data configured for streaming playback. The apparatus further includes means for accessing size information for each of the one or more media segments. The apparatus further includes means for encoding the size information for each of the one or more media segments in a media file within one or more metadata tracks associated with the one or more media segments or one or more sub-segments associated with the one or more media segments. The one or more metadata tracks comprises one or more byte sizes of one or more tiles in each of the one or more media segments or the one or more sub-segments.

In some implementations of such an apparatus, the one or more metadata tracks represent one or more tiling structure of one or more media tracks associated with the one or more metadata tracks. In some embodiments, the one or more metadata tracks are configured to be made available to a media player together with a presentation of each of the one or more media segments in order to provide prior information about the one or more media segments before a download or a presentation associated with each of the one or more media segments. In some embodiments, the one or more metadata tracks are linked to one or more video adaptation sets or representations in the media file or media presentation manifest information.

In another example embodiment, a method is provided that includes accessing one or more media segments. The one or more media segments includes media data configured for streaming playback. The method further includes accessing priority rank information for one or more tiles of the one or more media segments. The method further includes encoding the priority rank information for one or more tiles of the one or more media segments in a media file as part of an index segment associated with the one or more media segments. The part of the index segment comprises one or more priority ranks of the one or more tiles in each of the one or more media segments.

In some implementations of such a method, the part of the index segment comprises priority ranks of one or more sub-segments of the one or more media segments. In some embodiments, the index segment is configured to be made available to a media player together with a presentation of each of the one or more media segments in order to provide prior information about the one or more media segments before a download or a presentation associated with each of the one or more media segments.

In another example embodiment, a method is provided that includes accessing one or more media segments. The one or more media segments includes media data configured for streaming playback. The method further includes accessing priority rank information for one or more tiles of the one or more media segments. The method further includes encoding the priority rank information for one or more tiles of the one or more media segments in a media file within one or more metadata tracks associated with the one or more media segments or one or more sub-segments associated with the one or more media segments. The one or more metadata tracks comprises one or more priority ranks of the one or more tiles in each of the one or more media segments or the one or more sub-segments.

In another example embodiment, an apparatus is provided that includes at least one processor and at least one memory including computer program code for one or more programs with the at least one memory and the computer program code configured to, with the at least one processor, cause the apparatus at least to access one or more media segments. The one or more media segments includes media data configured for streaming playback. The computer program code is further configured to, with the at least one processor, cause the apparatus to access priority rank information for one or more tiles of the one or more media segments. The computer program code is further configured to, with the at least one processor, cause the apparatus to encode the priority rank information for one or more tiles of the one or more media segments in a media file as part of an index segment associated with the one or more media segments. The part of the index segment comprises one or more priority ranks of the one or more tiles in each of the one or more media segments.

In some implementations of such an apparatus, the part of the index segment comprises priority ranks of one or more sub-segments of the one or more media segments. In some embodiments, the index segment is configured to be made available to a media player together with a presentation of each of the one or more media segments in order to provide prior information about the one or more media segments before a download or a presentation associated with each of the one or more media segments.

In another example embodiment, an apparatus is provided that includes at least one processor and at least one memory including computer program code for one or more programs with the at least one memory and the computer program code configured to, with the at least one processor, cause the apparatus at least to access one or more media segments. The one or more media segments includes media data configured for streaming playback. The computer program code is further configured to, with the at least one processor, cause the apparatus to access priority rank information for one or more tiles of the one or more media segments. The computer program code is further configured to, with the at least one processor, cause the apparatus to encode the priority rank information for one or more tiles of the one or more media segments in a media file within one or more metadata tracks associated with the one or more media segments or one or more sub-segments associated with the one or more media segments. The one or more metadata tracks comprises one or more priority ranks of the one or more tiles in each of the one or more media segments or the one or more sub-segments.

In another example embodiment, a computer program product is provided that includes at least one non-transitory computer-readable storage medium having computer executable program code instructions stored therein with the computer executable program code instructions comprising program code instructions configured, upon execution, to access one or more media segments. The one or more media segments includes media data configured for streaming playback. The computer executable program code instructions comprise program code instructions that are further configured, upon execution, to access priority rank information for one or more tiles of the one or more media segments. The computer executable program code instructions comprise program code instructions that are further configured, upon execution, to encode the priority rank information for one or more tiles of the one or more media segments in a media file as part of an index segment associated with the one or more media segments. The part of the index segment comprises one or more priority ranks of the one or more tiles in each of the one or more media segments.

In some implementations of such a computer program product, the part of the index segment comprises priority ranks of one or more sub-segments of the one or more media segments. In some embodiments, the index segment is configured to be made available to a media player together with a presentation of each of the one or more media segments in order to provide prior information about the one or more media segments before a download or a presentation associated with each of the one or more media segments.

In another example embodiment, a computer program product is provided that includes at least one non-transitory computer-readable storage medium having computer executable program code instructions stored therein with the computer executable program code instructions comprising program code instructions configured, upon execution, to access one or more media segments. The one or more media segments includes media data configured for streaming playback. The computer executable program code instructions comprise program code instructions that are further configured, upon execution, to access priority rank information for one or more tiles of the one or more media segments. The computer executable program code instructions comprise program code instructions that are further configured, upon execution, to encode the priority rank information for one or more tiles of the one or more media segments in a media file within one or more metadata tracks associated with the one or more media segments or one or more sub-segments associated with the one or more media segments. The one or more metadata tracks comprises one or more priority ranks of the one or more tiles in each of the one or more media segments or the one or more sub-segments.

In another example embodiment, an apparatus is provided that includes means for accessing one or more media segments. The one or more media segments includes media data configured for streaming playback. The apparatus further includes means for accessing priority rank information for one or more tiles of the one or more media segments. The apparatus further includes means for encoding the priority rank information for one or more tiles of the one or more media segments in a media file as part of an index segment associated with the one or more media segments. The part of the index segment comprises one or more priority ranks of the one or more tiles in each of the one or more media segments.

In some implementations of such an apparatus, the part of the index segment comprises priority ranks of one or more sub-segments of the one or more media segments. In some embodiments, the index segment is configured to be made available to a media player together with a presentation of each of the one or more media segments in order to provide prior information about the one or more media segments before a download or a presentation associated with each of the one or more media segments.

In another example embodiment, an apparatus is provided that includes means for accessing one or more media segments. The one or more media segments includes media data configured for streaming playback. The apparatus further includes means for accessing priority rank information for one or more tiles of the one or more media segments. The apparatus further includes means for encoding the priority rank information for one or more tiles of the one or more media segments in a media file within one or more metadata tracks associated with the one or more media segments or one or more sub-segments associated with the one or more media segments. The one or more metadata tracks comprises one or more priority ranks of the one or more tiles in each of the one or more media segments or the one or more sub-segments.

BRIEF DESCRIPTION OF THE DRAWINGS

Figure 1:
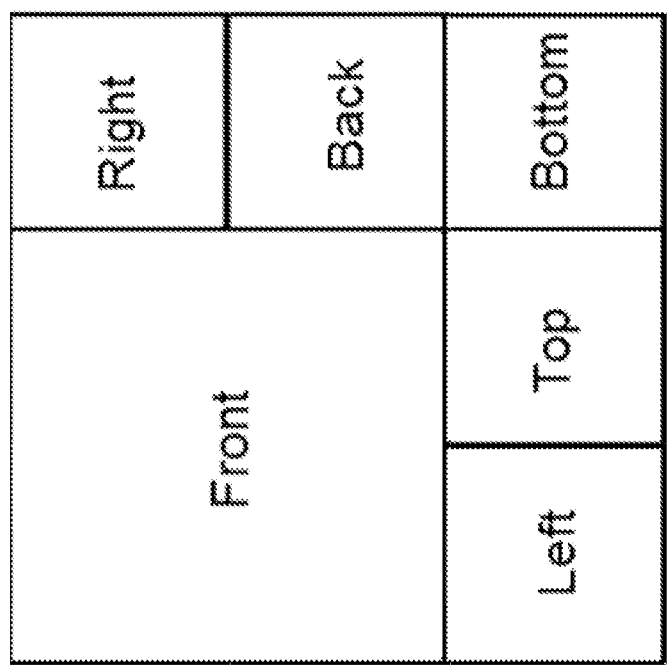
Figure 2:
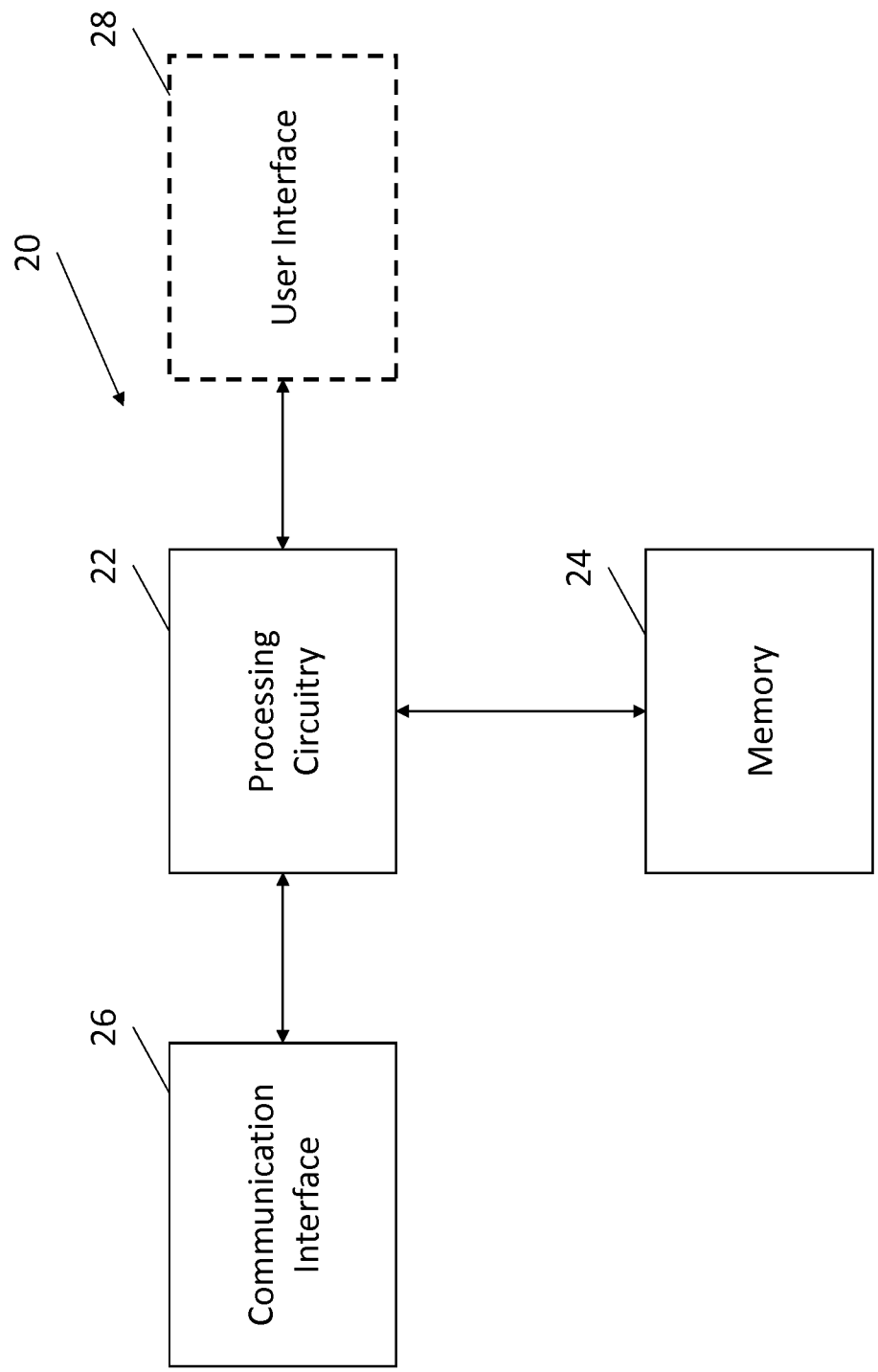
Figure 3:
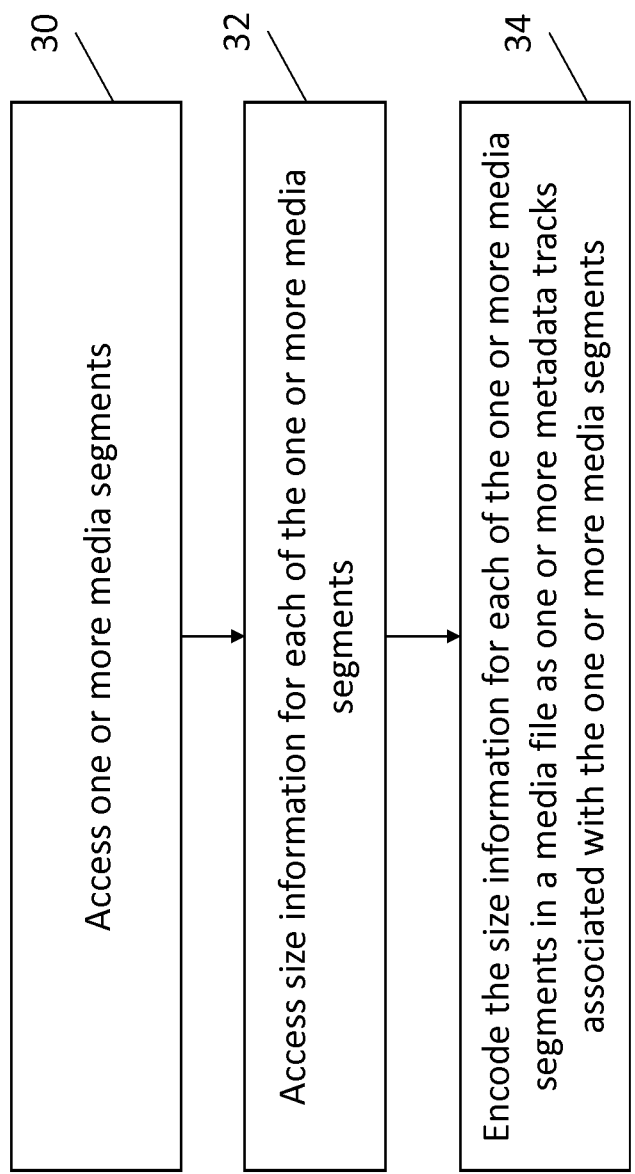
Figure 4:
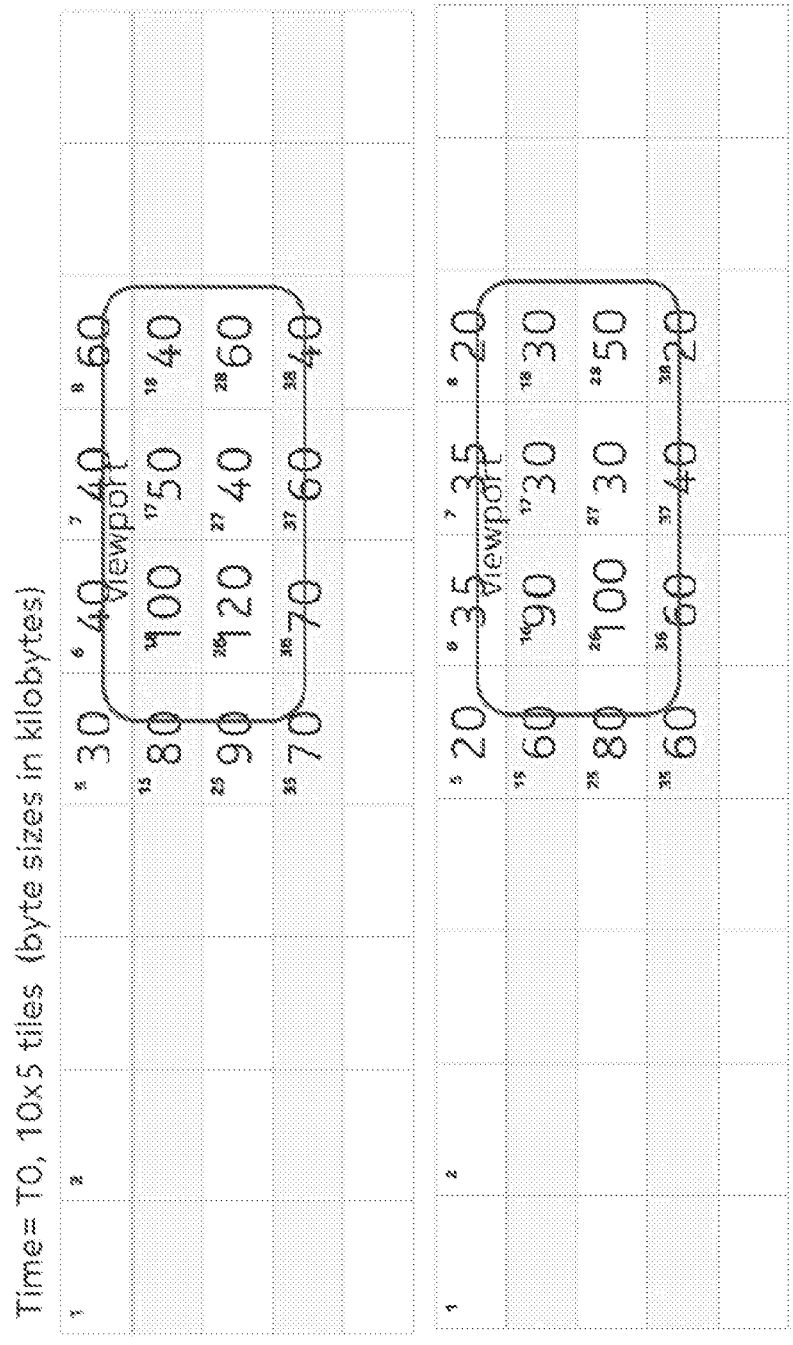
Figure 5:
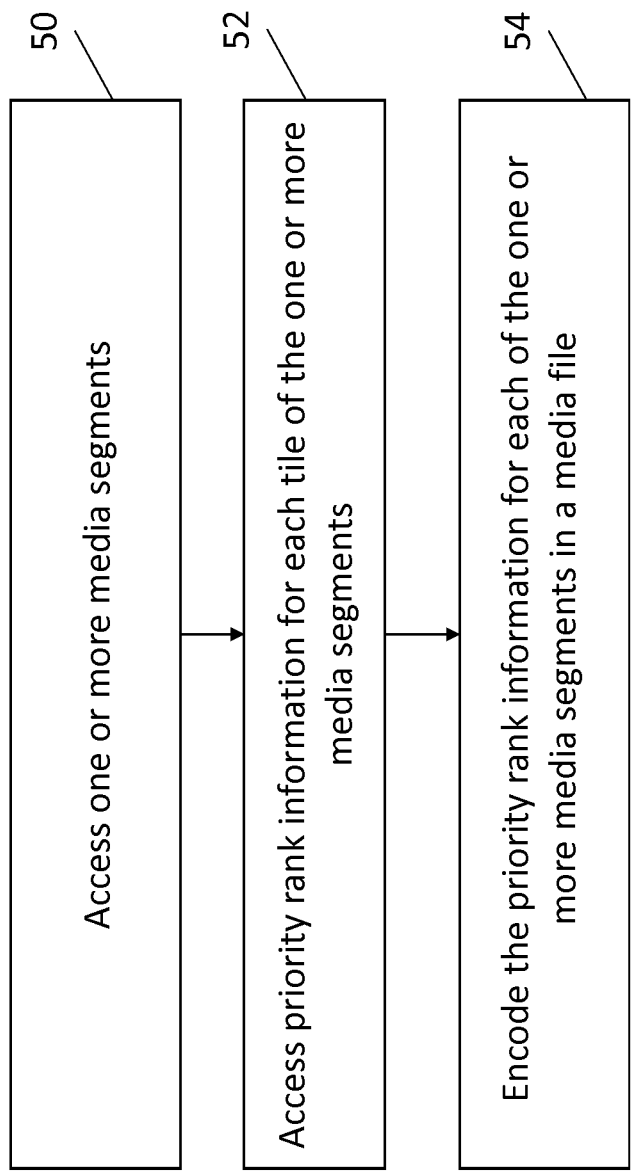
Figure 7:
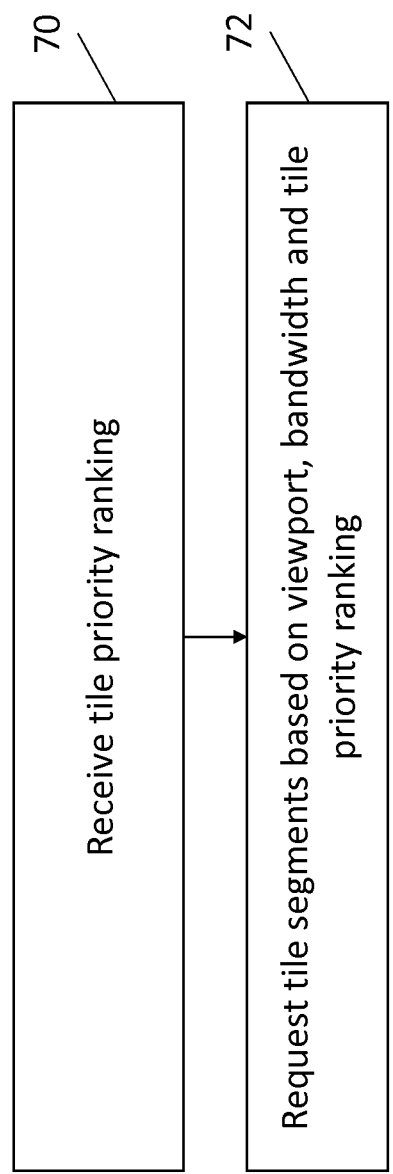
Figure 8A:
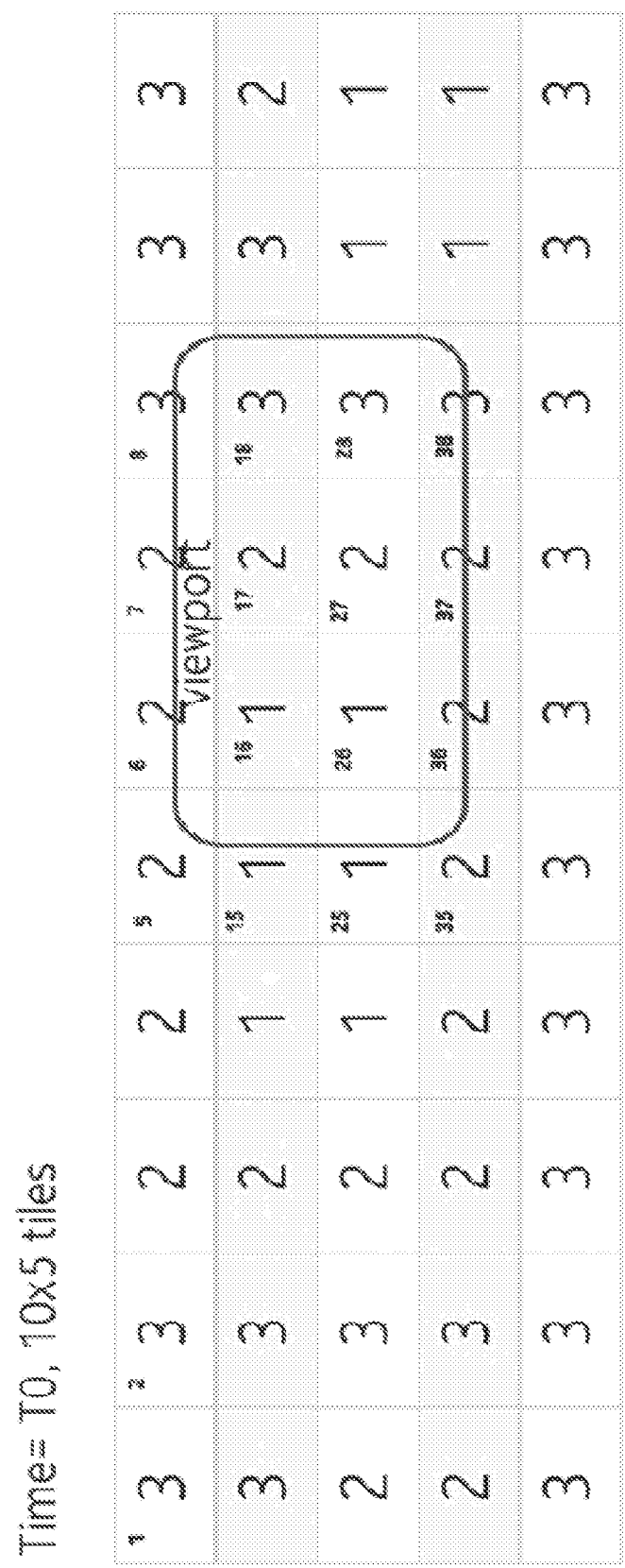

Having thus described certain example embodiments of the present disclosure in general terms, reference will hereinafter be made to the accompanying drawings, which are not necessarily drawn to scale, and wherein:

FIG. 1 is a graphical illustration of an example cube map;

FIG. 2 is a block diagram of an apparatus that may be specifically configured in accordance with an example embodiment of the present disclosure;

FIG. 3 is a flowchart illustrating a set of operations performed, such as by the apparatus of FIG. 2, in accordance with an example embodiment of the present disclosure;

FIG. 4 is a graphical illustration of byte sizes of tiles in a media segment for each adaptation set in accordance with an example embodiment of the present disclosure;

FIG. 5 is a flowchart illustrating a set of operations performed, such as by the apparatus of FIG. 2, in accordance with an example embodiment of the present disclosure;

FIGS. 6A and 6B is a graphical illustration of run-length coded tile ranks in accordance with an example embodiment of the present disclosure;

FIG. 7 is a flowchart illustrating a set of operations performed, such as by the apparatus of FIG. 2, in accordance with an example embodiment of the present disclosure; and FIGS. 8A, 8B, and 8C are graphical illustrations of tile ranks in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, the term "omnidirectional content" may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

As used herein, the term "viewport" or "VR viewport" refers to a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (HFoV) and a vertical field-of-view (VFoV).

A sphere region may be defined as a region on a sphere that may be specified by four great circles or by two azimuth circles and two elevation circles and additionally by a tile angle indicating rotation along the axis originating from the sphere origin passing through the centre point of the sphere region. A great circle may be defined as an intersection of the sphere and a plane that passes through the centre point of the sphere. A great circle is also known as an Orthodrome or Riemannian circle. An azimuth circle may be defined as a circle on the sphere connecting all points with the same azimuth value. An elevation circle may be defined as a circle on the sphere connecting all points with the same elevation value.

As used herein, an "orientation" (such as an orientation of a viewport, for example) may be represented by angular coordinates of a coordinate system. Angular coordinates may, for example, be called yaw, pitch, and roll, indicating the rotation angles around certain coordinate axes, such as y, x and z, respectively. Yaw, pitch, and roll may be used, for example, to indicate an orientation of a viewport. In some contexts, viewport orientation may be constrained; for example, roll may be constrained to be 0. In some such examples, and in other examples, yaw and pitch indicate the Euler angle of the center point of the viewport in degrees. In most contexts, yaw is applied prior to pitch, such that yaw rotates around the Y-axis, and pitch around the X-axis. Likewise, in most contexts, the angles increase clockwise as viewed when looking away from the origin.

As used herein, "tiles" or a "subpictures" refer to independently decodable regions within a picture and may be used interchangeably. Tiles or subpictures within a picture may share header information. The term tile is not necessarily the same as the term tile in some video coding formats, such as HEVC. In relation to some video coding formats, the term tile is used herein to indicate a motion-constrained tile set (MCTS), which may be defined as a rectangular region within a coded picture that is constrained so that the no sample values or variables outside the MCTS in the current picture or outside the respective MCTSs in the reference pictures for predicting the current picture are used in encoding or decoding.

As used herein, the term "random access" refers to the ability of a decoder to start decoding a stream at a point other than the beginning of the stream and recover an exact or approximate reconstructed media signal, such as a representation of the decoded pictures. A random access point and a recovery point may be used to characterize a random access operation. A random access point may be defined as a location in a media stream, such as an access unit or a coded picture within a video bitstream, where decoding can be initiated. A recovery point may be defined as a first location in a media stream or within the reconstructed signal characterized in that all media, such as decoded pictures, at or subsequent to a recovery point in output order are correct or approximately correct in content, when the decoding has started from the respective random access point. If the random access point is the same as the recovery point, the random access operation is instantaneous; otherwise, it may be gradual.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI.

A URI comprises a scheme part (identifying e.g. the protocol for the URI) and a hierarchical part identifying the resource, and these two parts are separated by a colon character. A URI may optionally comprise a query part (separated by the character "?") and/or a fragment part (separated by the character '#').

The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In order to reduce the streaming bitrate of omnidirectional media such as virtual reality (VR) video, a subset of 360-degree video content covering the viewport, i.e., the part of the 360-degree video displayed for the current view orientation, may be transmitted at a quality/resolution that is higher than the quality/resolution at which the remaining of the 360-degree video may be transmitted. The better quality/resolution part of the 360-degree video may cover a larger area enclosing the viewport. Generally, approaches that may be utilized for such viewport-adaptive streaming comprise but are not limited to the two approaches presented below.

The first approach is viewport-specific encoding and streaming, which utilizes viewport-dependent encoding and streaming and may also be referred as asymmetric projection or packed VR video. In this approach, 360-degree image content is packed into the same frame with an emphasis (e.g. greater spatial area) on the viewport. The packed VR frames are encoded into a single bitstream. For example, the front face of a cube map may be sampled with a higher resolution compared to other cube faces and the cube faces may be mapped to the same packed VR frame as illustrated in FIG. 1.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

The second approach is tile-based encoding and streaming. In this approach, 360-degree content is encoded and made available in a manner that enables selective streaming of viewports from different encodings. For example, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations). In another example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be to be decoded and played based on the current viewing orientation. High-resolution or high-quality tracks (or Representations) may be selected for tile sets covering the present viewport, while the remaining area of the 360-degree content may be obtained from low-resolution or low-quality tracks (or Representations).

Example embodiments provides the advantage of both of these approaches. A method, apparatus and computer program product are provided in accordance with an example embodiment to signal and store various segment properties in omnidirectional media, including sizes, priority ranks, and the like.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), Matroska file formats, file formats for NAL (Network Abstraction Layer) unit structured video (ISO/IEC 14496-15) and $3^{rd}$ Generation Partnership Project (3GPP file format) (3GP format). ISOBMFF is the base for derivation of all the above mentioned file formats. The method, apparatus, and computer program product may be utilized in conjunction with the Omnidirectional Media Format ("OMAF") standard.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be a recommended viewport per the director's cut, e.g., a viewport suggested according to the creative intent of the content author or content provider.

Region-wise quality ranking metadata may be present in or along a video or image bitstream. Region-wise quality ranking metadata for ISOBMFF and DASH MPD has been specified in OMAF. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata. DASH MPD or other streaming manifests may include region-wise quality ranking signaling. For example, OMAF specifies the spherical region-wise quality ranking (SRQR) and the 2D region-wise quality ranking (2DQR) descriptor for carrying quality ranking metadata for sphere regions and for 2D regions on decoded pictures, respectively.

Content coverage may be defined as one or more sphere regions that are covered by the content represented by the track or an image item. Content coverage metadata may be present in or along a video or image bitstream, e.g. in a CoverageInformationBox specified in OMAF. Content coverage may be indicated to apply for monoscopic content, either view of stereoscopic content (as indicated), or both views of stereoscopic content. When indicated for both views, the content coverage of left view might or might not match with the content coverage of the right view. DASH MPD or other streaming manifests may include content coverage signaling. For example, OMAF specifies the content coverage (CC) descriptor carrying content coverage metadata.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats. Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Example embodiments are described in conjunction with the ISOBMFF or its derivatives, however, the present disclosure is not limited to ISOBMFF, but rather the description is given for one possible basis on top of which an example embodiment of the present disclosure may be partly or fully realized.

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labelled through the box type (e.g., the four-character code of the box) of the contained box(es).

The ISOBMFF Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as ISO/IEC 14496-15 (Carriage of network abstraction layer (NAL) unit structured video in the ISO base media file format), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOBMFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
    unsigned int(32) entry_count;
        for (i=1; i <= entry_count; i++) {
            if (version==1) {
                unsigned int(64) segment_duration;
                int(64) media_time;
            } else { // version==0
                unsigned int(32) segment_duration;
                int(32) media_time;
            }
            int(16) media_rate_integer;
            int(16) media_rate_fraction = 0;
        }
}
```

In ISOBMFF, an EditListBox may be contained in EditBox, which is contained in TrackBox ('trak'). In this example of the edit list box, flags specifies the repetition of the edit list. By way of example, setting a specific bit within the box flags (the least significant bit, i.e., flags & 1 in ANSI-C notation, where & indicates a bit-wise AND operation) equal to 0 specifies that the edit list is not repeated, while setting the specific bit (i.e., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) may be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type) extends
FullBox(track_group_type, version = 0, flags = 0)
{
    unsigned int(32) track_group_id;
    // the remaining data may be specified for a particular track_group_type
}
``` track_group_type indicates the grouping_type and may be set to a value, or a value registered, or a value from a derived specification or registration. Example value include 'msrc' which indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant. The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in the same group. The syntax of EntityToGroupBox in ISOBMFF is as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that may not be equal to any group_id value of any other EntityToGroupBox, any item_ID value of the hierarchy level (file, movie. or track) that contains the GroupsListBox, or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

Example embodiments are described in conjunction with DASH or its derivatives, however, the present disclosure is not limited to DASH, but rather the description is given for one possible basis on top of which an example embodiment of the present disclosure may be partly or fully realized. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request. The MPD may contain elements and/or attributes from which URLs of Initialization Segment(s), Index Segment(s) (if any), and Media Segment(s) can be derived.

To play the content, a DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are structured in a defined way. All descriptor element contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required, then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent if: 1) the element name, 2) the value of the @schemeIdUri and 3) the value of the @value attribute are equivalent. If the @schemeIdUri is a URN, then equivalence may refer to lexical equivalence as defined in clause 5 of Request for Comments (RFC) 2141 provided by IETF (Internet Engineering Task Force). If the @schemeIdUri is a URL, then equivalence may refer to equality on a character-for-character basis as defined in clause 6.2.1 of RFC 3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

SRD (Spatial Relationship Description) is specified in the normative Annex H of MPEG-DASH. The following contains some excerpts of the SRD specification. The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD may be contained exclusively in these two MPD elements (AdaptationSet and SubRepresentation). Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined. For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. The spatial_set_id parameter may be used by the DASH client to quickly select spatially related Spatial Objects.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

An Initialization Segment may be defined as a Segment containing metadata that is necessary to present the media streams encapsulated in Media Segments. In ISOBMFF based segment formats, an Initialization Segment may comprise the Movie Box (moov) which might not include metadata for any samples, i.e. any metadata for samples is provided in 'moof' boxes.

An Index Segment may be defined as a Segment that primarily contains indexing information for Media Segments. An Index Segment may provide information for one or more Media Segments.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box (a.k.a. SegmentIndexBox), which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

DASH supports rate adaptation by dynamically requesting Media Segments from different Representations within an Adaptation Set to match varying network bandwidth.

When a DASH client switches up/down Representation, coding dependencies within Representation have to be taken into account. A Representation switch may happen at a random access point (RAP), which is typically used in video coding techniques such as H.264/AVC. In ISOBMFF and DASH, a more general concept named Stream Access Point (SAP) is available to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. If the @level attribute is present in the SubRepresentation element, Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate.

The Initialization Segment and/or the Media Segments and/or the Index Segments may provide sufficient information such that the data corresponding to Sub-Representations can be easily accessed through HTTP partial GET requests. The details on providing such information are defined by the media format in use. When ISOBMFF Segments are used, the following applies:
1. The Initialization Segment contains the Level Assignment box.
2. The Subsegment Index box ('ssix') is present for each Subsegment.
3. The attribute @level specifies the level to which the described Sub-Representation is associated to in the Subsegment Index. The information in Representation, Sub-Representation and in the Level Assignment ('leva') box contains information on the assignment of media data to levels.
4. Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie fragment. When the Level Assignment box is present, it applies to all movie fragments subsequent to the initial movie fragment. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. HEVC pictures of a certain TemporalId value may be mapped to a particular temporal level using the Temporal Level sample grouping (and the same can be repeated for all TemporalId values). The Level Assignment box may then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros, if not, the sample data for samples assigned to levels that are not accessed is not present.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level 1 elements and padding. A Segment Index of DASH may comprise a Cues Element of Matroska.

OMAF defines MPEG-DASH elements for associating various DASH elements. A SupplementalProperty element with a @schemeIdUri attribute equal to "urn:mpeg:mpeg-tomaf:2018:assoc" is referred to as an association descriptor. One or more association descriptors may be present at adaptation set level, representation level, preselection level. An association descriptor included inside an adaptation set/representation/preselection element indicates that the parent element of this element's descriptor (i.e. adaptation set/representation/preselection element) is associated with one or more elements in the MPD indicated by the XPath query in the omaf2:Association element and the association type signalled by omaf2:@associationKindList.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF). The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pia'. The resource (whether within the same file, or in an external file identified by a uniform resource identifier) containing the coded media data is resolved through the Data Information (die) box, whereas the Item Location ('floc') box stores the position and sizes of every item within the referenced file. The Item Reference Oren box documents relationships between items using typed referencing. If there is an item among a collection of items that is in some way to be considered the most important compared to others then this item is signalled by the Primary Item ('pitm') box. Apart from the boxes mentioned here, the 'meta' box is also flexible to include other boxes that may be necessary to describe items.

Any number of image items may be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using item references of types 'thmb' or 'auxl', respectively.

Regardless of the file format utilized, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 20 of an example embodiment includes, is associated with or is otherwise in communication with processing circuitry 22, a memory 24, a communication interface 26 and optionally, a user interface 28 as shown in FIG. 2.

The processing circuitry 22 may be in communication with the memory 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is configured to encode the video bitstream, the apparatus 20 may optionally include a user interface 28 that may, in turn, be in communication with the processing circuitry 22 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory 24, and/or the like).

Example embodiments provide a signaling and storage mechanism for various segment properties in omnidirectional media, including sizes, priority ranks, and the like. Some embodiments store and signal an indication of the approximate or exact sizes or the bit rates of media segments of a media delivery session (e.g., an OMAF session) in (or make parseable from) a bit stream, a container file, a manifest or a generic communication protocol. The client player, after receiving such information, would be able to make better throughput predictions when a combination of different quality tiles are selected for downloading at a given time interval. An OMAF player may be able to compare the presentation timeline and the segment availability times (which can be derived from the segment size and available bandwidth information) in order to obtain the look-ahead measurements for optimized bit rate allocation and tile download decisions. This mechanism provides the benefit of avoiding bandwidth overruns due to rapid changes across different segments with different sizes which may lead to bad user experience.

Referring now to FIG. 3, the operations performed, such as by an encoder embodied by the apparatus 20 of FIG. 2, in order to cause signaling and storage of size information for media segments in accordance with an example embodiment are depicted.

As shown in block 30, the apparatus includes means, such as the processing circuitry 22, for accessing one or more media segments. The one or more media segments includes media data configured for streaming playback.

As shown in block 32, the apparatus includes means, such as the processing circuitry 22, for accessing size information for each of the one or more media segments.

As shown in block 34, the apparatus includes means, such as the processing circuitry 22, for encoding the size information for each of the one or more media segments in a media file within one or more metadata tracks associated with the one or more media segments or one or more sub-segments associated with the one or more media segments. The one or more metadata tracks comprises one or more byte sizes of one or more tiles in each of the one or more media segments or the one or more sub-segments. The media file also include the one or more media segments. In some embodiments, the one or more metadata tracks may represent one or more tiling structure of one or more media tracks associated with the one or more metadata tracks. In some embodiments, the one or more metadata tracks may be linked to one or more video adaptation sets or representations in the media file or media presentation manifest information.

The one or more metadata tracks are configured to be made available to a media player together with a presentation of each of the one or more media segments in order to provide prior information about the one or more media segments before a download or a presentation associated with each of the one or more media segments. In some embodiments related to DASH, the server may send the byte sizes of the tiles in the media segment for each DASH adaptation set before the presentation time of the segment. A graphical illustration of byte sizes of tiles in a media segment for each adaptation set is provided in FIG. 4.

The media player may be able to requests proper tile segments from different adaptation sets by analyzing the current available throughput, viewport and bandwidth policy. The media player may be able to combine these tiles by utilizing various playback operations, such as OMAF VDS. When the viewport changes, the player may utilize the byte size allocation for tiles to pre-fetch the highest possible visual representation while keeping the throughput within the available limits.

In some embodiments related to ISOBMFF, the media file may comprise index segments for ISOBMFF tracks, comprising SegmentIndexBox(es) that index the respective media segments. In timed metadata tracks, for each segment duration, the size information may be stored as a tiles byte size table in a timed metadata sample spanning the duration of the segment. A timed metadata track could be retrieved faster than the actual media data representations, therefore, look-ahead on the player side is made possible. In some embodiments, metadata samples of the timed metadata track may be time aligned with the media samples of the corresponding media tracks which contains the tiles. In some embodiments, there may be fewer samples than the corresponding media track.

In some embodiments, a timed metadata track may represent a subset of the overall tiling structure which may be the same tiling structure of the related media track. In some embodiments, there may be multiple such metadata tracks inside the size & rank indicating metadata segment, where each track may correspond to a separate media track that covers a portion of the overall picture which is tiled. Each such metadata track may be linked to the media track via DASH @associationId and @associationType attributes as defined in OMAF standard. In some embodiments, the semantics of these attributes may be extended to signal association with multiple representations, i.e. they may contain an ordered list of representation Ids or association types.

In some embodiments, the metadata track may be linked to the video adaptation sets and defined for the whole period in the MPD. Additionally, in some embodiments, metadata track may be linked to the Representations by listing the track Ids of the representations in the metadata track, as an example in track reference box or EntitytoGroupBox.

In some embodiments, the table value of the tiles byte size table may be quantized to "steps". The usage of quantization steps may be signaled in the timed metadata sample itself. For example, 0-1 Megabyte (MB) can be divided into 64 steps for the integer part and 64 steps for the decimal part. 100.58 can be signaled as {10, 5}, hence as a 16 bit number (8.8). In some embodiments, table values may be scaled by a scale factor to optimize the byte allocation per each table entry. In some embodiments, the table may be present for each random access point or Group of Pictures (GOP) in order to have even finer granularity. In some embodiments, adaptation set identifiers may be used in the metadata sample to be indicative of segments (e.g. segment identifiers, URLs, or URL templates) and/or representation identifiers.

In some embodiments, the metadata sample may have the following structure in ISOBMFF.

```
aligned(8) class SegmentSizeSample {
    unsigned int(8) num_entries;
    for (i = 0; i < num_entries; i++)
        unsigned int(16) tile_byte_size;
}
```

In another embodiment, SegmentSizeSamples may be present for one or more sub-segments of the one or more media segments, hence providing a better granularity of tile size information.

SegmentSizeSample indicate a metadata sample which contains or indicates the byte size information of each tile for a particular duration in time. tile_byte_size specifies the sum of byte sizes of tiles that needs to be downloaded from the current sample time or presentation time that corresponds to this metadata sample until the next metadata sample's sample time or presentation time. num_entries specifies the number of entries present in this sample. Each entry corresponds to a tile_byte_size in the corresponding media track. The corresponding media tracks may be listed in the Track Reference Box with a specific type. An example is provided below:

```
aligned(8) class TrackReferenceBox extends Box('tref') {
    TrackReferenceTypeBox [ ];
}
aligned(8) class TrackReferenceTypeBox (unsigned int(32) reference_type) extends Box(reference_type) {
    unsigned int(32) track_IDs[ ];
}
```

As an example, reference_type='tsiz' may be defined and it may indicate that the metadata samples carry information about the tracks indicated by the track identifier values in the track IDs[ ] array. The order of the array entries (of the track IDs[ ] array) may be the same as the order of tile_byte_size entries in the SegmentSizeSamples and have a one-to-one relationship. The tile locations could be identified by utilizing the Spatial Relationship Description (SRD) or Content Coverage (CC) descriptors in DASH MPD, which utilize the schemeIdUri and additional parameters in an EssentialProperty or SupplementalProperty as defined in OMAF and/or DASH standards.

In another embodiment, the link between the DASH representations and metadata track which carries the segment size information may be established by a mapping which utilizes unique identifiers. The list of such identifiers may be stored in the metadata sample entry in a pre-defined order. Each unique identifier may be then present as a property (either essential or supplementary) in the related representations of the DASH manifest. An example is provided below:

```
aligned(8) class SegmentSizeSampleEntry(type) extends MetadataSampleEntry('ssse') {
    unsigned int(8) num_entries;
    for (i = 0; i < num_entries; i++)
        unsigned int(16) unique_id;
}
``` num_entries indicates the number of entries in the sample entry. unique_id is a unique number among the listed entries. In another embodiment, this number could be unique for the whole presentation. Each representation in DASH MPD which contribute to this metadata track lists one of these unique numbers as a property. The order of the unique numbers indicate the order of the tile sizes in the metadata sample. An example snippet from the MPD may be as follows:

```
<Period>
    <!-- Sub-picture 1 -->
    <AdaptationSet segmentAlignment="true" subsegmentAlignment="true" subsegmentStartsWithSAP="1">
        <EssentialProperty schemeIdUri="urn:mpeg:dash:srd:2014" value="0,0,0,640,640,3840,1920"/>
        <SupplementalProperty schemeIdUri="urn:mpeg:mpegI:omaf:2017:cc">
            <omaf:cc shape_type="1" view_idc_presence_flag="0" default_view_idc="0">
                <omaf:coverageInfo
                    centre_azimuth="9830400"
                    centre_elevation="3932160"
                    azimuth_range="3932160"
                    elevation_range="3932160"
                />
            </omaf:cc>
        </SupplementalProperty>
        <Representation id="1" mimeType='video/mp4 profiles="hevd"' codecs="resv.podv+erpv.hvc1.2.L123.B0" width="640" height="640" bandwidth="79707" startWithSAP="1">
            <EssentialProperty schemeIdUri="urn:mpeg:mpegI:omaf:2017:pf" omaf:projection_type="0"/>
            <EssentialProperty schemeIdUri="urn:mpeg:mpegI:omaf:2017:rwpk" omaf:packing_type="0"/>
            <SupplementalProperty schemeIdUri="urn:mpeg:mpegI:omaf:2017:ssse" omaf:unique_id="1234"/>
            <BaseURL> subpic1.mp4</BaseURL>
            <SegmentBase indexRangeExact="true" indexRange="837-988"/>
        </Representation>
    </AdaptationSet>
```

In DASH, the unique_id supplemental property may be also present in the segment size metadata track's metadata sample entry. This property may be also defined as an essential property.

In some alternative embodiments, the list of unique identifiers for each representation could be listed as part of an essential or supplemental property in the segment size metadata track. For example, two representations which belong to the same adaptation set are defined and listed with different unique_ids inside a defined SupplementalPropery which is identified by its schemeIdURI (" . . . :ssse"). The listed schemeIdURI is given as an example and different identifiers may be used. Segment Size metadata is defined as another adaptation set and linked to the above-mentioned representations via the unique_id values attribute. This attribute lists the unique_id values of the related representations in the same order as their data is present in the metadata sample entry. Example snippet of MPD in these embodiments is provided below:

```
<Period>
    <!-- Sub-picture 1 -->
    <AdaptationSet segmentAlignment="true" subsegmentAlignment="true" subsegmentStartsWithSAP="1">
        <EssentialProperty schemeIdUri="urn:mpeg:dash:srd:2014" value="0,0,0,640,640,3840,1920"/>
        <SupplementalProperty schemeIdUri="urn:mpeg:mpegI:omaf:2017:cc">
            <omaf:cc shape_type="1" view_idc_presence_flag="0" default_view_idc="0">
                <omaf:coverageInfo
                    centre_azimuth="9830400"
                    centre_elevation="3932160"
                    azimuth_range="3932160"
                    elevation_range="3932160"
                />
```

-continued

```
        </omaf:cc>
      </SupplementalProperty>
      <Representation id="1" mimeType='video/mp4 profiles="hevd"'
codecs="resv.podv+erpv.hvc1.2.L123.B0" width="640" height="640"
bandwidth="79707" startWithSAP="1">
            <EssentialProperty schemeIdUri="urn:mpeg:mpegI:omaf:2017:pf"
                omaf:projection_type="0"/>
            <EssentialProperty schemeIdUri="urn:mpeg:mpegI:omaf:2017:rwpk"
                omaf:packing_type="0"/>
            <SupplementalProperty schemeIdUri="urn:mpeg:mpegI:omaf:2017:ssse"
                omaf:unique_id="1234"/>
            <BaseURL> subpic1.mp4</BaseURL>
            <SegmentBase indexRangeExact="true" indexRange="837-988"/>
      </Representation>
      <Representation id="1" mimeType='video/mp4 profiles="hevd"'
codecs="resv.podv+erpv.hvc1.2.L123.B0" width="640" height="640"
bandwidth="79707" startWithSAP="1">
            <EssentialProperty schemeIdUri="urn:mpeg:mpegI:omaf:2017:pf"
                omaf:projection_type="0"/>
            <EssentialProperty schemeIdUri="urn:mpeg:mpegI:omaf:2017:rwpk"
                omaf:packing_type="0"/>
            <SupplementalProperty schemeIdUri="urn:mpeg:mpegI:omaf:2017:ssse"
                omaf:unique_id="5678"/>
            <BaseURL> subpic1.mp4</BaseURL>
            <SegmentBase indexRangeExact="true" indexRange="837-988"/>
      </Representation>
    </AdaptationSet>
    <!—Segment Size metadata -->
    <AdaptationSet segmentAlignment="true" subsegmentAlignment="true"
subsegmentStartsWithSAP="1">
      <Representation id="segment-size-metadata" mimeType='application/mp4'
associationId="360-video" associationType="cdsc" codecs="rcvp" bandwidth="100">
            <BaseURL>recomended_viewport.mp4</BaseURL>
            <SupplementalProperty schemeIdUri="urn:mpeg:mpegI:omaf:2017:ssse"
                omaf:unique_id_values="1234, 5678"/>
      </Representation>
    </AdaptationSet>
. . . .
```

In some alternative embodiments, the order of the tiles may be determined by a pre-defined scanning order of the tiles in the media track's decoded picture. For example, the tile scanning order may be enumerated by a parameter inside the SegmentSizeSample such as:

```
aligned(8) class SegmentSizeSample {
    unsigned int(8) tile_scanning_order;
    unsigned int(8) num_entries;
    for (i = 0; i < num_entries; i++)
        unsigned int(16) tile_byte_size;
}
``` tile_scanning_order specifies the scanning order which may be enumerated, in some example embodiments, as follows: 0 indicates horizontal scanning from top-left tile rightwards, then moving to the next tile row and start from the leftmost tile (a.k.a. raster scan order, a.k.a. row-major order); and 1 indicates vertical scanning from top-left tile downwards, then moving to the next tile column and start from the topmost tile (a.k.a. column-major order). Other types of enumerations may be defined in other embodiments. It needs to be understood that even though many example embodiments include the tile_scanning_order syntax element, embodiments could be similarly realized without the tile_scanning_order syntax element by pre-defining (e.g. in a standard) or inferring the tile_scanning_order.

In another embodiment, the scanning order information could be put in a metadata sample entry. An example metadata sample entry is provided below:

```
aligned(8) class SegmentSizeSampleEntry(type) extends
MetadataSampleEntry('ssse') {
    unsigned int(8) tile_scanning_order;
}
```

'ssse' metadata sample entry type is given as an example.

In some alternative example embodiments, tile_byte_size information may be replaced with a relative magnitude information where instead of using actual values, a scaled or quantified value could be present. In such a case, the definition and the type of this field may be different. The following example are provided:

```
aligned(8) class SegmentSizeSample {
    unsigned int(16) base_byte_size;
    unsigned int(8) tile_scanning_order;
    unsigned int(8) num_entries;
    for (i = 0; i < num_entries; i++)
        unsigned int(16) tile_byte_size;
}
``` base_byte_size may indicate a base value for the size. When this value is multiplied with the tile_byte_size, the actual byte size (possibly quantified) could be reached. Utilization of such a parametric approach may enable compacting the SegmantSizeSample by introducing smaller parameter type values (e.g. using 4 bits instead of 8 or 16 bits per tile_byte_size).

In some alternative example embodiments, base_tile_size could be stored in a metadata sample entry. An example metadata sample entry is provided below:

```
aligned(8) class SegmentSizeSampleEntry(type) extends
MetadataSampleEntry('ssse') {
    unsigned int(8) tile_scanning_order;
    unsigned int(16) base_byte_size;
}
```

The base_byte_size value may be applicable to all samples that are linked to this sample entry.

In some alternative embodiment, the byte size values may be stored in a differential manner, for example, as a signed "delta" value compared to the previous tile size in the scanning order.

In some embodiments utilizing DASH, a server may have a URI parameter which can be sent by the player to access this table information in an HTTP response or REST API such as: HTTP GET http://cdn.com/myvideo?segment_tile_sizes=10-11 . . . (asking for the segment tile sizes for the segments 10 to 11 inclusive). A HTTP Response 400 OK may be received and the message body may include segment tile sizes and adaptation set id (segment_tile_sizes={(adaptation set id, run of 16 bit integer values)}).

Referring now to FIG. 5, the operations performed, such as by an encoder embodied by the apparatus 20 of FIG. 2, in order to cause signaling and storage of priority rank information for media segments in accordance with an example embodiment are depicted. If there are M×N tiles in a picture of a media segment, there will be M×N relative priority rank values for a media segment to be communicated to the player. The relative priority rank values could have a time granularity which may be as short as the duration of a single picture, as minimum. By utilizing the ranking values and the visible viewport region, a media player may be able to decide in which order to request the tiles and switch to a higher quality for each tile. The ranking may be defined based on at least on, but not limited to, any of the following:

- Complexity of the content of each tile. Examples could be:
  - Textures and objects in the scene (e.g., number of objects)
  - Motion in the scene (e.g., people walking from one side to the other or a car moving from one side to the other, or in general the degree of motion within the tile)
- Saliency map estimation
- Hot spot (e.g., if the tile is within a pre-defined hot spot, it could be ranked high)
- Statistics and/or collective data on viewing orientations and/or viewports. For example, viewers' collected gaze and/or Head Mounted Display orientation information of previous sessions
- Bit rate (e.g., a tile could be ranked high because it requires a low bit rate in order to be transmitted over a channel)
- Position within the projection format (e.g., tiles at the top or bottom in equirectangular projection, may be ranked low)
- Size (e.g., a tile of large spatial size may be ranked high, compared to a tile of small size).
- Region-wise quality ranking information.

When the viewport changes, the player takes into account the tile priority rankings to request the high quality tiles. In some embodiments, the player may opt to not request the high quality tiles of the low priority ranks, but only request the high quality ranking tiles in the segment duration. Such priority rank storage and signal mechanism may be utilized in single picture video such as MPEG HEIF, point cloud coded media streams, and the like. Embodiments may use different streaming media protocols, such as MPEG-DASH, and various real-time low delay uni-directional or bi-directional media communication and covering different network topologies such as point-to-point, point-to-multipoint, peer-to-peer and use any communication protocol at any of the ISO Open System Interconnection (OSI) protocol layers. Embodiments related to ISOBMFF and MPEG-DASH are provided as an example.

As shown in block 50, the apparatus includes means, such as the processing circuitry 22, for accessing one or more media segments. The one or more media segments includes media data configured for streaming playback.

As shown in block 52, the apparatus includes means, such as the processing circuitry 22, for accessing priority rank information for one or more tiles of the one or more media segments.

As shown in block 54, the apparatus includes means, such as the processing circuitry 22, for encoding the priority rank information for one or more tiles of the one or more media segments in a media file. In some embodiments, the priority rank information for one or more tiles of the one or more media segments in a media file is encoded within one or more metadata tracks associated with the one or more media segments or one or more sub-segments associated with the one or more media segments, for example, as metadata samples. The one or more metadata tracks comprises one or more priority ranks of the one or more tiles in each of the one or more media segment. In some embodiments, the priority rank information for one or more tiles of the one or more media segments in a media file may also include priority rank information for one or more tiles of one or more sub-segments of the one or more media segments. In some embodiments, the one or more metadata tracks may be linked to one or more video adaptation sets or representations in the media file or media presentation manifest information.

In some embodiments, the priority rank information for one or more tiles of the one or more media segments in a media file is encoded as part of an index segment associated with the one or more media segments. The part of the index segment comprises one or more priority ranks of the one or more tiles in each of the one or more media segments. The media file also include the one or more media segments. The part of the index segment may also comprise priority ranks of one or more sub-segments of the one or more media segments. In some embodiments, the index segment is configured to be made available to a media player together with a presentation of each of the one or more media segments in order to provide prior information about the one or more media segments before a download or a presentation associated with each of the one or more media segments. In some embodiments, the tile priority ranks are stored in one or more metadata tracks that also comprises size information. In some embodiments, the priority rank information for one or more tiles of the one or more media segments in a media file may also include priority rank information for one or more tiles of one or more sub-segments of the one or more media segments.

Similar to the operations described in conjunction with FIG. 3 the one or more metadata tracks are configured to be made available to a media player together with a presentation of each of the one or more media segments in order to provide prior information about the one or more media segments before a download or a presentation associated with each of the one or more media segments. In some embodiments related to DASH, the server may send the byte sizes of the tiles in the media segment for each DASH adaptation set before the presentation time of the segment. A graphical illustration of byte sizes of tiles in a media segment for each adaptation set is provided in FIG. 4.

The media player may be able to requests proper tile segments from different adaptation sets by analyzing the current available throughput, viewport and bandwidth policy. The media player may be able to combine these tiles by utilizing various playback operation, such as OMAF VDS. When the view port changes, the player may utilize the byte size allocation for tiles to pre-fetch the highest possible visual representation while keeping the throughput within the available limits.

In some embodiments related to ISOBMFF, the Index Segment(s) include one or more SegmentIndexBoxes.

The DASH MPD attribute @indexRange may provide the byte range that contains the Segment Index in Media Segments of the Representation, wherein the Segment Index may comprise of the SegmentIndexBox(es) describing the Media Segment(s) associated with the @indexRange attribute. Thus, a DASH client may use an HTTP GET request with the byte range given by @indexRange to obtain the SegmentIndexBox(es) describing the Media Segment(s).

In example setups for on-demand streaming, all SegmentIndexBoxes are arranged at the beginning of the file and provide information of the Sub-Segments of the entire Representation. Hence, according to an embodiment, priority ranking on Sub-Segment granularity could be provided in an extension of SegmentIndexBox or in box(es) next to SegmentIndexBox(es). In an embodiment, the SegmentIndexBox(es) and possibly the box(es) next to SegmentIndexBox(es) (e.g. when TilePriorityRankingBox or alike is next to SegmentIndexBox rather than in the SegmentIndexBox) are included into and/or parsed from the Index Segment(s) and/or indicated by and/or decoded from the byte range given in the @indexRange attribute.

A new box or new syntax elements may extend or accompany the SegmentIndexBox which may contain segment or sub-segment level tile priority ranking information as discussed further below. SegmentIndexBox may be defined as provided in the ISOBMFF specification:

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)              reference_type;
        unsigned int(31)     referenced_size;
        unsigned int(32)     subsegment_duration;
        bit(1)               starts_with_SAP;
        unsigned int(3)      SAP_type;
        unsigned int(28)     SAP_delta_time;
    }
}
``` reference_track_ID provides the track_ID for the reference track; if this Segment Index box is referenced from a 'parent' Segment Index box, the value of reference_ID may be the same as the value of reference_ID of the 'parent' Segment Index box. timescale provides the timescale, in ticks per second, for the time and duration fields within this box. earliest_presentation_time is the earliest presentation time of any sample in the reference track in the first subsegment, expressed in the timescale of the timescale field. first_offset is the distance in bytes from the first byte following the containing Segment Indexing Box, to the first byte of the first referenced box. reference_count is the number of elements indexed by second loop.

reference_type: when set to 0 indicates that the reference is to a movie fragment ("moof") box; when set to 1 indicates that the reference is to a segment index ("sidx") box.

referenced_size: the distance in bytes from the first byte of the referenced box to the first byte of the next referenced box or in the case of the last entry, the first byte not indexed by this Segment Index Box.

subsegment_duration: when the reference is to Segment Index Box, this field carries the sum of the subsegment_duration fields in that box; when the reference is to a subsegment, this field carries the difference between the earliest presentation time of any sample of the reference track in the next subsegment (or the first subsegment of the next segment, if this is the last subsegment of the segment or the end composition time of the reference track if this is the last subsegment of the representation) and the earliest presentation time of any sample of the reference track in the referenced subsegment; the duration is expressed in the timescale value in this box.

starts_with_SAP indicates whether the referenced subsegments start with a SAP. For the detailed semantics of this field in combination with other fields.

SAP_type indicates a Stream Access Points (SAP) type as discussed earlier or the value 0. SAP_delta_time: indicates TSAP of the first SAP, in decoding order, in the referenced subsegment for the reference stream. If the referenced subsegments do not contain a SAP, SAP_delta_time is reserved with the value 0; otherwise SAP_delta_time is the difference between the earliest presentation time of the subsegment, and the TSAP (note that this difference may be zero, in the case that the subsegment starts with a SAP).

The new full box may be called TilePriorityRankingBox. The type of this new box may be 'tprb' as an example. An example is provided below:

```
aligned(8) class TilePriorityRankingBox extends
FullBox ('tprb', version = 0, 0) {
    for (j = 0; j < reference_count; j++)
        for(k = 0; k < num_entries; k++)
            unsigned int(8) tile_priority_rank;
}
```

In an embodiment, TilePriorityRankingBox is present right after the SegmentIndexBox. In another embodiment, TilePriorityRankingBox is contained at the end of SegmentIndexBox. In yet another embodiment, the box payload of the TilePriorityRankingBox is contained at the end of SegmentIndexBox. In the embodiments that append new data at the end of the SegmentIndexBox, the version field in the box header of SegmentIndexBox may equal to 0, in which case legacy file parsers omit the data at the end of the box but otherwise parse and utilize SegmentIndexBox(es) in a conventional manner. Alternatively, a previously unused value of the version field in the box header of SegmentIndexBox may be used, in which case legacy file parsers might omit the entire box.

reference_count may be as defined in the SegmentIndexBox and it may take the same value as defined in this box. num_entries define the number of tiles present in the picture. tile_priority_rank is an integer starting from 1. The higher the number, the important the information content of the related tile. In another embodiment, tile_priority_rank definition could be reversed (i.e. lower numbers may indicate more important information content). Tile scanning order may be pre-defined or signalled as defined for the segment sizes (i.e. tile_scanning_order), which can be included in the TilePriorityRankingBox. Example syntax could be as follows:

```
aligned(8) class TilePriorityRankingBox extends
FullBox('tprb', version=0, 0) {
    unsigned int(8) tile_scanning_order;
    for (j = 0; j < reference_count; j++)
        for(k = 0; k < num_entries; k++)
            unsigned int(8) tile_priority_rank;
}
``` tile_scanning_order is as defined for the segment sizes in the SegmentSizeSample.

In some alternative embodiments, TilePriorityRankingBox may be defined as a full box which follows the SegmentIndexBox or present inside the SegmentIndexBox where SegmentIndexBox version is different than 0.

```
aligned(8) class TilePriorityRankingBox extends
FullBox ('tprb', version = 0, 0) {
    unsigned int(8) tile_scanning_order; //optional
    for (j = 0; j < reference_count; j++)
        for(k = 0; k < num_entries; k++)
            unsigned int(8) tile_priority_rank;
}
```

In some alternative embodiments, rankings may be present in the timed metadata samples, may be together with the segment size tables. If they are stored as a timed metadata sample, the metadata sample may be as follows:

```
aligned(8) class TilePrioritySample{
    unsigned int(8) tile_scanning_order;
    for (j = 0; j < reference_count; j++)
        unsigned int(8) tile_priority_rank;
}
``` reference_count indicates the number of priority ranks present in the metadata sample. As an example, for a tiling structure of 3×6, there could be 18 tile_priority_rank values present in a TilePrioritySample. The scanning order of the tiles maybe defined by tile_scanning_order (as defined for the SegmentSizeSample above).

The semantics of the fields may be as specified above. These samples may have similar characteristics as the SegmentSizeSamples in a metadata track, having a similar relationship with the related media track that they are related to.

In some alternative embodiments, the ranking values may have a range which may be defined in the metadata sample entry or the sample itself. If defined in the metadata sample entry, the semantics and syntax may be as follows:

```
aligned(8) class TilePrioritySampleEntry(type) extends
MetadataSampleEntry('tpse') {
    unsigned int(8) minimum_priority_rank;
    unsigned int(8) maximum_priority_rank;
}
```

Metadata sample entry name and type are given as an example. minimum_priority_rank indicates the least number which could be given as a priority rank. maximum_priority_rank indicates the least number which could be given as a priority rank. The higher the priority rank, the more important the information content of a tile.

In some embodiments, the tile ranks may be run-length coded as in the example illustrated in FIGS. 6A and 6B. Each grid item in FIGS. 6A and 6B represents a tile of an encoded picture. A run-length coded structure may compact the number of entries in the metadata samples.

An example metadata sample may be as follows:

```
aligned(8) class TilePrioritySample{
    unsigned int(8) tile_scanning_order;
    for (j = 0; j < entry_count; j++)
        unsigned int(8) tile_priority_rank;
        unsigned int(8) tile_priority_run;
}
``` tile_priority_run indicates how many consecutive tiles in tile_scanning_order have the same tile_priority_rank value.

In some alternative embodiments, both segment tile size and tile priority ranking information may be stored together in a metadata track. In such embodiments, the syntax of the metadata sample and sample entry may be as follows:

```
aligned(8) class TileInformationSampleEntry(type) extends
MetadataSampleEntry('tise'){
    unsigned int(8) minimum_priority_rank;
    unsigned int(8) maximum_priority_rank;
    unsigned int(8) tile_scanning_order;
}
aligned(8) class TileInformationSample{
    for (j = 0; j < reference_count; j++) {
        unsigned int(16) tile_byte_size;
        unsigned int(8) tile_priority_rank;
    }
}
```

The semantics of the fields in TileInformationSampleEntry and TileInformationSample are as defined above. In some embodiments, other fields in other embodiments described before may be included in the above-mentioned data structure.

In some embodiments related to DASH, priority ranks may be signaled as DASH events in the MPD or in the Representation. In some embodiments, priority ranks may be present in the MPD as a separate adaptation set with a pre-defined schemeIdURI as an EssentialProperty. One example could be as follows:

```
<MPD>
<Period>
. . . .
. . . . (definition of other representations in the MPD)
```

```
<!--Priority Ranks -->
<AdaptationSet segmentAlignment="true"
subsegmentAlignment="true"
subsegmentStartsWithSAP="1">
    <Representation id="priority-ranks"
mimeType='application/mp4' >
        <BaseURL>priority_ranks.mp4</BaseURL>
    </Representation>
</AdaptationSet>
</Period>
</MPD>
```

In some alternative embodiments, priority ranks or initial priority ranks may be listed in the MPD. This information may be utilized to define the initial download order of the segments.

In some embodiments, the server may have a URI parameter which can be sent by the player to access the table information in an HTTP response or REST API. HTTP GET may be transmitted, by way of example, in the form of http://cdn.com/myvideo?segment_priority_ranks=10-11 ... (asking segment priority ranks for the segments 10 to 11 inclusive). HTTP Response 400 OK may be transmitted, the message body may include, by way of example, tile_priority_ranks={10, {(2,2), (3,1), (2,1),(1,2), (3,1),(1,2)}, 11, {(2, 2), (3,1), (2,1),(1,2), (3,1),(1,2)}. In this example, a run-length coded set of priority ranks are listed. They may have been listed without such run-length coding. Moreover, a scanning order may be signaled inside with the tile_priority_ranks.

Referring now to FIG. 7, the operations performed, such as by a player embodied by the apparatus 20 of FIG. 2, in order to play one media segment in accordance with an example embodiment are depicted. A streaming server may send tile priority rank to the player client before the playback starts.

As shown in block 70, the apparatus includes means, such as the processing circuitry 22 and/or the communication interface 26, for receiving the tile priority ranking. The tile priority ranking may take the form of the tile priority ranks described in conjunction with FIG. 5.

As shown in block 72, the apparatus includes means, such as the processing circuitry 22, for requesting tile segments based on one or more of viewport, bandwidth and tile priority ranking.

FIGS. 8A, 8B, and 8C are graphical illustrations of tile ranks in accordance with an example embodiment of the present disclosure. In FIGS. 8A, 8B and 8C, the big number within each tile indicates the rank order (a lower number indicates a higher priority); the small numbers on the top left corner of each tile indicate an exemplary tile numbering. For the example illustrated in FIG. 8A, the player may request the tile segments in the following order:

15, 16, 25, 26, 17, 27, 5, 6, 7, 35, 36, 37, 8, 18, 28, 38.

The player may perform simultaneous download requests of the same priority ranked tile segments.

During the playback session, if for the next media segment duration, the priorities change but the view port stays the same, as illustrated in 8B, the player may request tile segments in the following order for the next media segment duration:

17, 27, 15, 25, 16, 28, 35, 36, 5, 6, 7, 8, 18, 26, 37, 38.

If the viewer changes view port, as illustrated in FIG. 8C, the player may tile segments in the following order for the current segment duration:

14, 24, 13, 23, 33, 34, 35 (assuming 15, 16, 25, 26 and 36 were already requested as high quality before based on previous priorities).

In some embodiments, the player selects the quality for different viewport regions to minimize the adverse impact of mosaic rendering by utilizing the ranking values and the visible viewport region. For example, the player may propagate a high quality content to its neighbors if a new high priority tile appears (which has more than a threshold difference with its neighbors). The player may also apply smoothening of gradient. In some embodiments, if there is a scene-cut, the priority ranking may be used as an intermediate value compared to the pre-scene cut values and start with shorter duration segment in order to facilitate fast convergence with the signaled priority rankings.

By utilizing such priority ranking and size storage and signaling mechanisms, several technical advantages are provided. If the client knows the segment sizes and their qualities beforehand, it can make a better decision in selecting which tile segments to download in VDS mode without any bandwidth throttling or buffer underflow/overflow. Further, fine grained access to tiles is available by prioritizing the high priority tiles' quality. In addition, better throughput/bandwidth handling is provided by selecting the optimal subset of the visible tiles which need to be high quality.

Such priority ranking and size storage and signaling mechanisms also enable pre-signaling the tile priority rankings per media segment, so that the player can be aware of how to prioritize the tile downloads before the segment is played back. Further, leveraging the tile the tile priorities for quality selection is made possible. This reduces bit rate spikes as well as provides fine grained control in utilization of the available bandwidth. By downloading tiles in priority order according to the priority ranking signaling mechanisms, it is more likely that the perceptually important tiles are received in time even in case of sudden throughput variations.

According to an embodiment, which may be used together with or independently of other embodiments, an indication is authored into and/or decoded from the Segment Index and/or in the streaming manifest, wherein the indication is indicative of whether the media data in the segment payload is tightly packed and in decoding order within the Media Segment(s). The segment payload may refer, for example, to the MediaDataBox, or to several MediaDataBoxes. When the media data is indicated to be tightly packed, it may be required that there is a single MediaDataBox for the segment or that that MediaDataBox(es) of the segment are contiguous, possibly interleaved only by non-essential boxes, such as FreeSpaceBox(es). Packing tightly refers to all bytes of the segment payload belonging to the media bitstream, i.e. that the segment payload consists of a contiguous range of bytes of the media bitstream (possibly excluding box header of MediaDataBoxes and non-essential boxes). It may further be required that tightly packing involves the media data to be self-contained in a manner that decoding and playback may happen without other metadata or with the metadata in Initialization Segment and Segment Index only. For example, tightly packing may involve including timing information in the media data. For example, it may be specified that picture order counts in video bitstream are indicative of the display times.

In the present embodiment, the Segment Index may for example comprise SegmentIndexBox(es) and any accompanying boxes, such as TilePriorityRankingBox(es). When the indication is present in a streaming manifest, the indication may be provided e.g. as a supplemental property in DASH MPD. The Segment Index may additionally or alternatively comprise BoxFileIndexBox specified in ISO/IEC 23001-14. The BoxFileIndexBox provides a summary of the box hierarchy of the associated segment. It contains a set of BoxIndexBox boxes, each of which describes one top-level box, e.g. giving the box type and box size (in bytes).

In an embodiment, the indication may be partitioned into several elements and/or attributes characterizing aspects of tight packing. For example, it may be indicated how timing information of the access units is embedded in the (Sub) segment payloads.

In an embodiment, information indicative of byte range(s) for (Sub)segment header(s) is authored into and/or decoded from the Segment Index. The (Sub)segment header(s) may comprise for example the MovieFragmentBox(es) and may fully or partly exclude the (Sub)segment payload. In an embodiment, information indicative of byte range(s) for (Sub)segment payload(s) is authored into and/or decoded from the Segment Index.

In an embodiment, information indicative of URL(s) and/or byte range(s) for requesting segment payload(s) separately from segment header(s) is authored into and/or decoded from a a streaming manifest. The segment header(s) may comprise for example the MovieFragmentBox(es).

The media bitstream in the (Sub)segment payload may be an encapsulated media bitstream. For example, the (Sub) segment payload may consist of a contiguous set of samples of a video track of an ISOBMFF file. For example, each data unit, such as a Network Abstraction Layer (NAL) unit, in the encapsulated media bitstream may be preceded by a length field indicative of the byte count of the data unit.

In an embodiment, a client concludes or estimates a URL(s) and/or a byte range(s) for (Sub)segment payload(s) e.g. from the information provided in the Segment Index and/or in the streaming manifest. The client also concludes or decodes from the streaming manifest that the media data is tightly packed. The client requests, e.g. with an HTTP GET request, the (Sub)segment payload(s) using the URL(s) and/or the byte range(s). The client omits requesting the (Sub)segment header(s). Since the media content is tightly packed and in decoding order, the (Sub)segment header(s) might not be necessary for decoding.

In an embodiment, the information that the segment payload is tightly packed makes it possible to detect access unit boundaries of a NAL-unit-structured video as follows: The MediaDataBox consists of length-prefixed NAL units, hence NAL units can be reliably identified from the payload of the MediaDataBox. Since NAL units are in correct decoding order, regular access unit boundary detection, as specified in H.264 and H.265, is sufficient for determining sample sizes. Hence, sample sizes need not be received from the segment header to decode and play media data. Furthermore, timing metadata for playback may be embedded in the (Sub)segment payloads. In an embodiment, the client generates (Sub)segment headers, such as MovieFragment-Box(es), by parsing the received (Sub)segment payloads. For example, the sample sizes can be authored based on the access unit boundary detection as presented herein. The client may reconstruct (Sub)segments by combining the generated (Sub)segment headers and (Sub)segment payloads.

There are several advantages related to the embodiments wherein (Sub)segment payloads are requested. For example, the amount of streamed data can be further reduced. The requests can be prioritized between (Sub)segment payloads and (Sub)segment headers, where (Sub)segment payloads have higher priority since (Sub)segment headers are not necessary for playback. The embodiments related to priority ranking and segment sizes may be used together with the embodiments wherein (Sub)segment payloads are requested in determining order and/or priority for requests.

As described above, FIGS. 3, 5, and 7 includes flowcharts of an apparatus 20, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by processing circuitry 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3, 5, and 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
accessing one or more media segments, wherein the one or more media segments comprise media data configured for streaming playback;
accessing priority rank information for one or more tiles of the one or more media segments; and
encoding the priority rank information for one or more tiles of the one or more media segments in a media file;
wherein the priority rank information encoded for the one or more tiles of the one or more media segments is time-varying;
wherein the media file is within one or more metadata tracks associated with one or more sub-segments associated with the one or more media segments, wherein the one or more metadata tracks comprises one or more priority ranks of the one or more tiles in the one or more sub-segments.

2. The method according to claim 1, wherein the media file is part of an index segment associated with the one or more media segments, wherein the part of the index segment comprises one or more priority ranks of the one or more tiles in the one or more media segments.

3. The method according to claim 2, wherein the part of the index segment comprises priority ranks of one or more sub-segments of the one or more media segments.

4. The method according to claim 2, wherein the index segment is configured to be made available to a media player together with a presentation of each of the one or more media segments in order to provide prior information about the one or more media segments before a download or a presentation associated with each of the one or more media segments.

5. The method of claim 2, wherein the priority rank information is stored in samples of a timed metadata track.

6. An apparatus comprising:
at least one processor; and
at least one non-transitory memory storing instructions that, when executed by the at least one processor, cause the apparatus at least to:
access one or more media segments, wherein the one or more media segments comprise media data configured for streaming playback;
access priority rank information for one or more tiles of the one or more media segments; and
encode the priority rank information for one or more tiles of the one or more media segments in a media file;
wherein the priority rank information encoded for the one or more tiles of the one or more media segments is time-varying;
wherein the media file is within one or more metadata tracks associated with one or more sub-segments associated with the one or more media segments, wherein the one or more metadata tracks comprises one or more priority ranks of the one or more tiles in the one or more sub-segments.

7. The apparatus according to claim 6, wherein the media file is part of an index segment associated with the one or more media segments, wherein the part of the index segment comprises one or more priority ranks of the one or more tiles in the one or more media segments.

8. The apparatus according to claim 7, wherein the index segment is configured to be made available to a media player together with a presentation of each of the one or more media segments in order to provide prior information about the one or more media segments before a download or a presentation associated with each of the one or more media segments.

9. A computer program product comprises at least one non-transitory computer-readable storage medium having computer executable program code instructions stored therein, the computer executable program code instructions comprising program code instructions configured, upon execution, to:
access one or more media segments, wherein the one or more media segments comprise media data configured for streaming playback;
access priority rank information for one or more tiles of the one or more media segments; and
encode the priority rank information for one or more tiles of the one or more media segments in a media file;
wherein the priority rank information encoded for the one or more tiles of the one or more media segments is time-varying;
wherein the media file is within one or more metadata tracks associated with one or more sub-segments associated with the one or more media segments, wherein the one or more metadata tracks comprises one or more priority ranks of the one or more tiles in the one or more sub-segments.

10. The computer program product according to claim 9, wherein the media file is as part of an index segment associated with the one or more media segments, wherein the part of the index segment comprises one or more priority ranks of the one or more tiles in each of the one or more media segments.

11. The computer program product according to claim 10, wherein the part of the index segment comprises priority ranks of one or more sub-segments of the one or more media segments.

12. The computer program product according to claim 10, wherein the index segment is configured to be made available to a media player together with a presentation of each of the one or more media segments in order to provide prior information about the one or more media segments before a download or a presentation associated with each of the one or more media segments.

* * * * *